United States Patent
Eble et al.

(10) Patent No.: US 6,480,208 B1
(45) Date of Patent: Nov. 12, 2002

(54) METHOD AND CIRCUIT FOR CONTROLLING THE DISPLAY OF ITEMS OR INFORMATION WITH DIFFERENT DISPLAY PRIORITIES

(75) Inventors: Markus Eble, Munich (DE); Stefan Honold, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 925 days.

(21) Appl. No.: 08/726,946

(22) Filed: Oct. 7, 1996

(30) Foreign Application Priority Data

Oct. 6, 1995 (DE) .......................................... 195 37 372

(51) Int. Cl.7 ................................................. G09G 5/00
(52) U.S. Cl. ...................................... 345/807; 345/810
(58) Field of Search .............................. 345/684, 810, 345/807, 619; 340/525, 524, 459, 519, 691; 704/10

(56) References Cited

U.S. PATENT DOCUMENTS

| | | | | |
|---|---|---|---|---|
| 3,582,949 A | * | 6/1971 | Forst ......................... 340/519 |
| 4,511,764 A | * | 4/1985 | Nakayama et al. ......... 379/354 |
| 4,816,208 A | * | 3/1989 | Woods et al. ............... 340/525 |
| 5,006,829 A | * | 4/1991 | Miyamoto et al. .......... 340/459 |
| 5,121,112 A | * | 6/1992 | Nakadozono ............... 340/459 |
| 5,327,117 A | * | 7/1994 | Kohsaka ..................... 340/525 |
| 5,371,788 A | * | 12/1994 | Baals et al. ................. 379/396 |
| 5,377,261 A | * | 12/1994 | Baals et al. ............ 379/201.04 |
| 5,412,713 A | * | 5/1995 | Baals et al. ................. 345/810 |
| 5,420,968 A | * | 5/1995 | Johri ........................... 345/619 |
| 5,421,728 A | * | 6/1995 | Milden ........................... 434/5 |
| 5,430,440 A | * | 7/1995 | Shim ........................ 340/7.52 |
| 5,454,073 A | * | 9/1995 | Fukushima et al. ......... 345/807 |
| 5,487,104 A | * | 1/1996 | Baals et al. ................. 345/810 |
| 5,522,026 A | * | 5/1996 | Records et al. ............. 345/810 |
| 5,590,265 A | * | 12/1996 | Nakazawa ................... 345/807 |
| 5,748,174 A | * | 5/1998 | Wong et al. ................. 345/684 |
| 5,826,263 A | * | 10/1998 | Nakabayashi et al. ......... 707/7 |

FOREIGN PATENT DOCUMENTS

DE  OS-A-37 24613  2/1989

* cited by examiner

Primary Examiner—Steven Saras
Assistant Examiner—Paul A. Bell
(74) Attorney, Agent, or Firm—Staas & Halsey LLP

(57) ABSTRACT

A method and a circuit arrangement for controlling information to be displayed in an optical display installation in a program-controlled apparatus, in particular in a telecommunication apparatus. Display priority levels are allocated to the information to be displayed, so that information with higher priority levels are displayed with higher priority in relation to information with a lower priority level. The priority level of displayed information can be changed. The information with different priority levels comprise a concurrent information subset. The priority of currently displayed information preferably is lowered by at least two priority levels.

12 Claims, 4 Drawing Sheets

| SP | | 1 |
|---|---|---|
| | | 2 |
| t₁ | CALL NUMBER/NAME MENU | 3 |
| | | 4 |
| | | 5 |

FIG. 2a

| SP | | 1 |
|---|---|---|
| | | 2 |
| t₂ | | 3 |
| | | 4 |
| | CALL NUMBER/NAME MENU | 5 |

FIG. 2b

| SP | | 1 |
|---|---|---|
| | | 2 |
| t₃ | | 3 |
| | | 4 |
| | FEES MENU | 5 |

FIG. 2c

METHOD AND CIRCUIT FOR CONTROLLING THE DISPLAY OF ITEMS OR INFORMATION WITH DIFFERENT DISPLAY PRIORITIES

BACKGROUND OF THE INVENTION

The present invention generally relates to methods and circuits for displaying information in an optical display systems. More specifically, the invention relates to a method and circuit for controlling information displayed in optical display installation in a program-controlled apparatus, for example, a telecommunications apparatus, wherein both information to be displayed and currently displayed information are stored in a memory, and the information to be displayed is prioritized with respect to priority of display.

In German Offenlegungsschrift DE-OS 3724613, incorporated herein by reference, there is disclosed a method for the optical display of processes that are independent of a connection to and of processes that accompany a connection on the display of a digital telecommunication terminal apparatus suited for speech and/or data transmission. The terminal apparatus is provided with several subunits for automatically carrying out of determinate connection-independent or connection-accompanying processes via a display control, which processes are initiated by external events or by internal events formed by actuating numeric keys, function keys and name keys. Various display priorities and minimum display pages are allocated to the processes initiated by the external or internal events. After the termination of the minimum display, the display priority of the displayed process can be temporally changed, whereby the display priority of the current display is reduced step-by-step.

The display priority of the currently displayed process is repeatedly compared with the display priorities of processes to be displayed. After carrying out the priority comparison, the process with the highest display priority is displayed on the display. By this method, at least two different process designations are cyclically displayed. Likewise, displays of a single process designation can be cyclically displayed. In contrast, processes of different display priorities cannot be displayed at the same time.

SUMMARY OF THE INVENTION

An object of the present invention is to indicate a method and a circuit arrangement that make it possible to use an optical display installation in an expanded scope.

To that end, in an embodiment the invention provides a method for controlling information to be displayed in an optical display installation in a program-controlled apparatus comprising the steps of storing in a memory information to be displayed and currently displayed information, and allocating display priority levels to the information to be displayed, and displaying information with a higher priority level with a higher priority in relation to information with a lower priority level, whereby the priority level of displayed information can be changed, information with different priority levels comprising a concurrent information subset.

The invention provides numerous advantages. It enables the display of information in a temporal sequence according to different display priorities, as well as simultaneous display of further information. In addition to these display possibilities, which are not provided in the prior art, the control program of the display installation control unit, which implements the inventive method, can be constructed in a simple way.

Yet further, due to the fact that information to be displayed can be stored as a subset of stored information to be displayed with different further information in different priority levels, these information subsets can also be further displayed in a priority-conditioned manner.

These and other features of the invention are discussed in greater detail below in the following detailed description of the presently preferred embodiments with reference to the accompanying drawings.

BRIEF DESCRIPTION OF THE DRAWINGS

FIGS. 2a–2c illustrate contents of display memories in the telecommunication terminal apparatus of FIG. 1.

DETAILED DESCRIPTION OF THE PRESENTLY PREFERRED EMBODIMENTS

Figure 1:
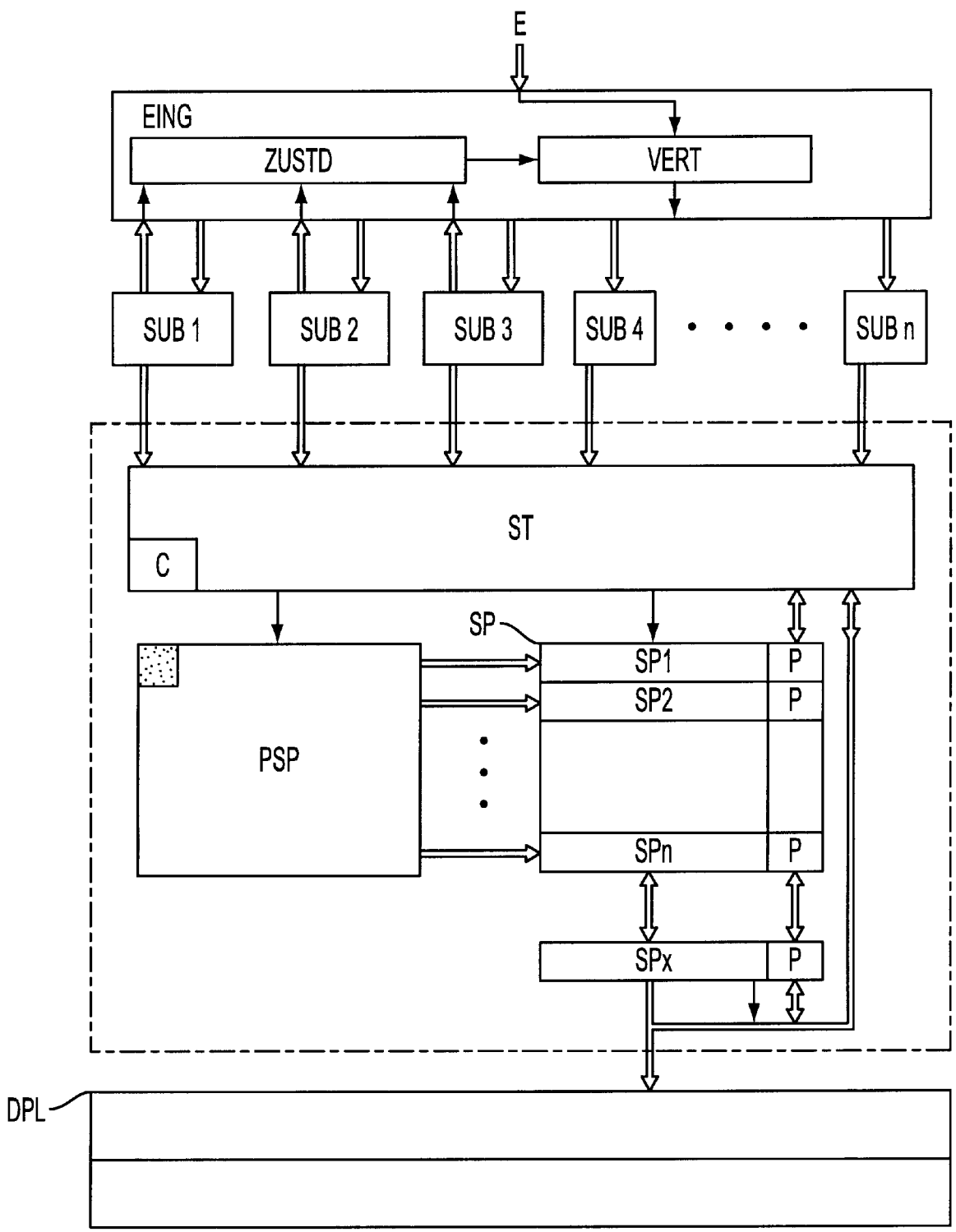
FIG. 1 illustrates a block diagram of a telecommunication terminal apparatus in which the inventive method can be carried out.

A telecommunication terminal apparatus shown in FIG. 1 comprises an input circuit EING at an input side, which comprises a state memory ZUTD and an event distributor VERT. Several subunits SUB1, SUB2, . . . , SUBn are connected to the input circuit EING, as shown in FIG. 1.

The subunits SUB1, SUB2, . . . , SUBn are also connected to a control ST of the optical display installation. A timing element C is allocated to the control ST, which timing element serves for the measurement of the time of a display in an optical display installation DPL. The measured time can be compared by the control ST with a minimum and maximum display time allocated to each process.

In addition, the control ST is connected to a memory PSP that contains display parameters of the processes carried out by the subunits SUB1, SUB2, . . . , SUBn. The display parameters include display priorities or, respectively, priority levels P1, P2, . . . , Pn allocated to the processes, the indication of minimum and maximum display times if warranted, and the actual process designations, i.e. information that are displayed on the optical display installation DPL.

Furthermore, the control ST is connected to intermediate memories SP1, SP2, . . . , SPn. These intermediate memories serve for the reception of information to be displayed on the optical display installation DPL, i.e. designations of processes that have been or, respectively, are being carried out by the subunits SUB1, SUB2, . . . , SUBn. In addition to the process designations or, respectively, information to be displayed, the associated display priorities P1, P2, . . . , Pn of the processes to be displayed are stored in the intermediate memories SP1, SP2, . . . , SPn, in memory locations P. It can be provided that the memory locations P can be controlled independent of the intermediate memories SP1, SP2, . . . , SPn, in which the process designations or, respectively, information are stored, so that different priority level values can be allocated to the information stored in the intermediate memories SP1, SP2, . . . , SPn.

An additional memory SPx contains the process designation respectively contained in the optical display installation DPL, as well as, in a memory location P, the display priority Px of the displayed process designation.

External and internal events E are supplied to the input circuit EING via the input of the telecommunication terminal apparatus. External events are supplied to the telecommunication terminal apparatus, e.g., by a public switching installation or the central station of a private branch exchange. Internal events are formed by the actuation of numerical keys, function keys or name keys. The events E are supplied to the event distributor VERT, which forwards them to the individual subunits SUB1, SUB2, . . . , SUBn, dependent on the current data about these subunits stored in the state memory ZUSTD.

The data stored in the state memory ZUSTD indicate the function allocated to the subunits, as well as the current operational state. These data are switched in the state memory ZUSTD by the subunits. Different functions are assigned to the subunits SUB1, SUB2, . . . , SUBn. The subunit SUBI carries out, for example, processes associated with the setup and carrying out of speech connections.

The subunit SUB2 carries out, for example, processes that are associated with what are known as check functions. This term refers, for example, to the programming, controlling or erasing of destinations on name keys and direct call keys and for individual abbreviated dialing. These processes are initiated by actuating the corresponding function keys and/or numeric keys at the telecommunication terminal apparatus. The processes to be carried out by the subunit SUB2 can be carried out during times in which no speech connection is being set up or exists. The processes to be carried out by the subunit SUB2 can however also take place in a connection-accompanying manner.

The subunits SUB3–SUBn, also shown in FIG. 1, serve for automatically carrying out further processes. These further processes include, for example, processes associated with the setting up and carrying out of data connections, with operator control and with the realization of performance features such as for example the display of date and time. The events E, supplied to the subunits via the input circuit EING, initiate the automatic carrying out of the corresponding processes in the subunits. These processes, as well as the output signals (referred to herein also as SUB1, SUB2, . . . , SUBn) emitted by the subunits, are taken into account in the following description only to the extent that they serve for the controlling of the optical display installation DPL. It is thereby presupposed that the telecommunication terminal apparatus is provided only with a display capacity that is limited via an optical display installation DPL. The optical display installation DPL consists for example of two lines, whereby in particular one line, preferably the lower line, serves for the display of a menu.

The menu is always displayed, as far as is possible, during a connection setup, during a conversation or during the dismantling of the connection. It presents a user guide that offers possible performance features for selection, depending upon the connection situation or on the switching-oriented state. At any time, it is always the case that only one menu item can be offered on the display device DPL (in the second line). The further items can be displayed cyclically by actuating what are called paging keys of the terminal apparatus. The offered function can be confirmed (i.e. executed) using what is called an OK key. During the connection setup/dismantling, the priority for an active connection (see "display priority/priority level 3" below) can always be used for the display of the menu. During the connection setup, in addition to the menu (second line), the name and the call number of the called subscriber is displayed in the first line. A priority level (here, e.g., "3") is always allocated to both display lines. The menu should always be offered, as far as possible, and thus receives the relatively high priority "3," on which the call number and name are also displayed. However, during the conversation there is further information (e.g. fees (priority level 5) or the signaling of a second call (priority level 4)), which are to be displayed with their fixedly allocated priority levels. During the signaling of the second call, no menu is offered, since here only the takeover of the call is possible, which can be carried out exclusively by the call takeover key; there is no corresponding menu item.

The end of each process, e.g. the formation of a dial pulse by means of the actuation of a numeric key, is communicated to the control ST of the relevant subunit.

The control program allocated to the control ST is constructed in such a way that information with different priority levels comprise a concurrent information subset (e.g., "menu"). In addition, it can be provided that the priority level of displayed information is reduced by at least two priority levels after a minimum display time. The number of priority levels to be reduced is chosen so that an information subset still to be specified, e.g., the "menu," is as far as possible always displayed (in a telecommunication terminal apparatus: during a connection setup, during a set-up connection, and during the dismantling of a connection). The priority level of displayed information can thereby be reduced depending upon the display time, or the priority level of displayed information can be reduced depending upon state-individual information (in telecommunication apparatus: switching-state-individual information): internal, or, respectively, external events E. In place of a reduction of the priority level of displayed information by two priority levels, the displayed information can be erased in the memory, so that the process designation or, respectively, information then stored in the memory SP is displayed with highest priority.

Currently displayed information is stored in the memory SPx. The displayed information stored in the memory SPx is overwritten with information to be displayed that has the same priority level as the displayed information. Information that comprises the same priority level as the displayed information, but does not occur until after the beginning of the display, is thereby displayed in place of the originally displayed information.

A part of the process designations or, respectively, of the information to be displayed comprises a concurrent information subset. This is in particular the already-named menu that is preferably displayed in a determined display area, e.g. in the lower display line in a two-line display.

For example, the following display priorities are provided for the following displays:
1 (for time-limited displays)
2 (check/service-function)
3 (call number/name) (menu)
4 (signaling of a second call)
5 (display of fees) (menu)

The process designations with display priorities 3 and 5 thus respectively comprise the concurrent information subset "menu." The "menu" is respectively displayed in the lower line in a temporary menu.

With reference now to FIGS. 2a, 2b, 2c, 3a, 3b, 3c and 3d, examples are discussed for the management and display of process designations. The content of the display memory SP is thereby schematically indicated with the respective priority levels.

In FIG. 2a, at time t1 the process designation
"Call number/name
   Menu"
is located in the memory SP3 with priority 3. Since the display memory contains no further process designations with a priority greater than (>) 3, the process designation stored in the memory SP3 is displayed on the optical display installation DPL. It can be inventively provided that the priority of this process designation is reduced by two priority levels. The process designation "call number/name; menu" thereby receives the priority 5. This is shown in FIG. 2b, which shows the content of the display memory SP at time t2. Since at this time (t2) the display memory contains no further process designation with a priority greater than (>) 5, "call number/name; menu" is displayed unaltered.

At time t3 illustrated in FIG. 2c, the process designation
"Fees
Menu"
occurs. This process designation has priority level 5 and thereby has the same priority level as the process designation "call number/name; menu" shown in FIG. 2b.

According to the invention, at time t3 the originally displayed process designation "call number/name; menu" is overwritten by the occurrent process designation "fees; menu" with the same priority level. The concurrent information set "menu" is displayed at all three times t1, t2 and t3.

Figure 3A:
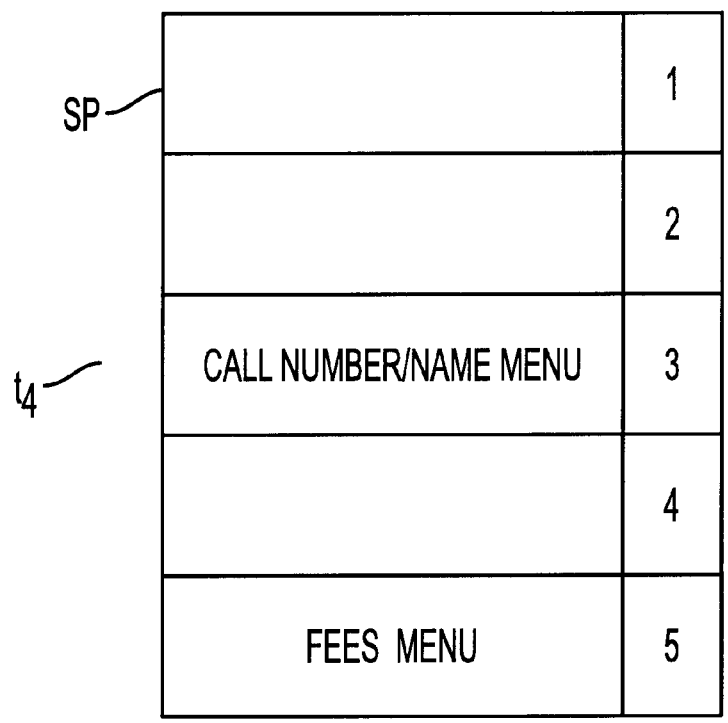
FIGS. 3a–3d illustrate further contents of display means in the telecommunication terminal apparatus.

As shown in FIG. 3a, at time t4 the process designation "call number/name; menu" is located in the memory SP3 with priority level 3, and the process designation (fees; menu) is located in the memory SP5 with priority level 5, so that the process designation "call number/name; menu" is displayed.

Figure 3B:
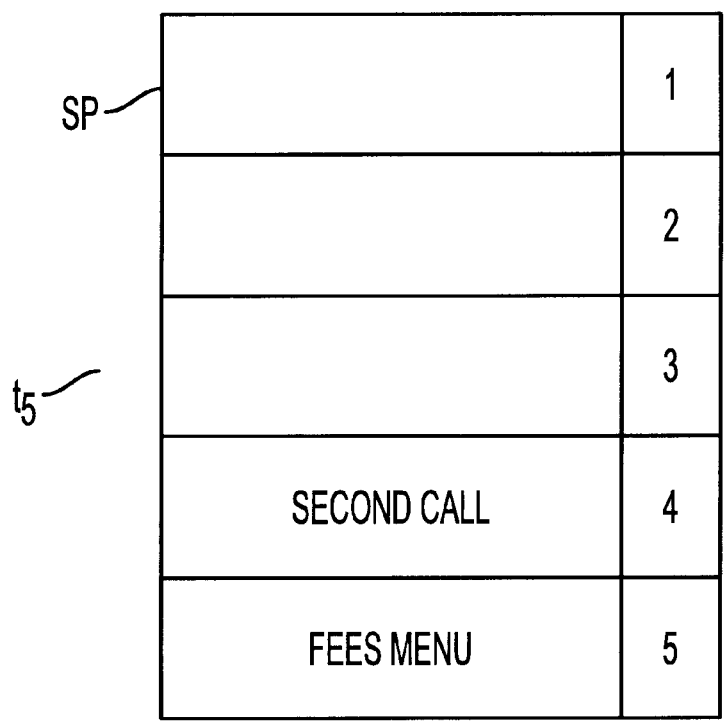

At time t5 illustrated in FIG. 3b, the process designation "second call," with display priority 4, is written into the memory SP4. The process designation "fees; menu" is located in the memory SP5 with priority 5, so that the process designation "second call" is displayed with the higher display priority 4.

Figure 3C:
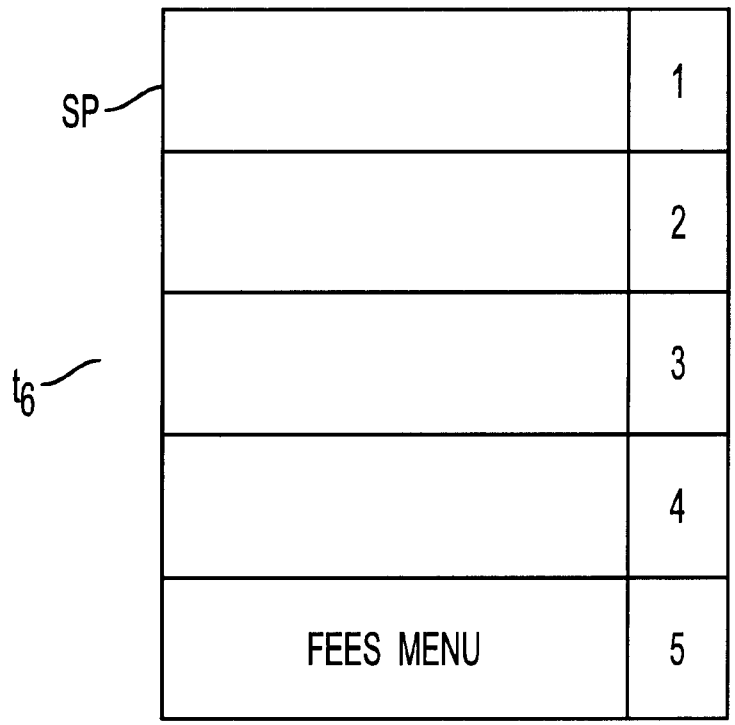
Figure 3D:
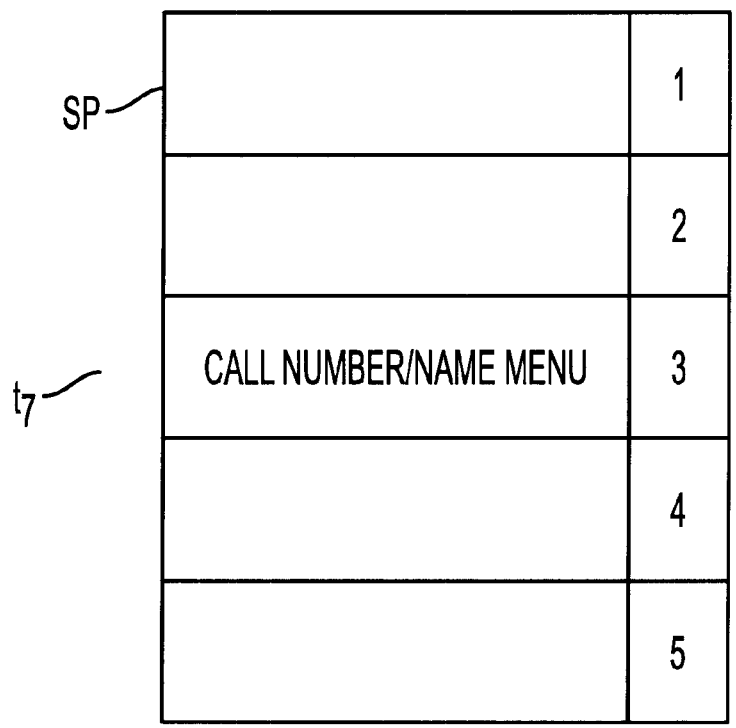

At time t6 illustrated in FIG. 3c, the second call is no longer present, so that "fees; menu" is displayed, with priority 5.

If the priority level of a display with "menu" is lowered, then the priority level of the display with "menu" is raised again during paging (or scrolling) through the menu items. The user of the terminal apparatus works at time t7, illustrated in FIG. 3d, with the menu, whose display is, as far as possible, not to be disturbed by other displays. So that the first line again fits the offered menu items (such as e.g. "callback," "hold for inquiry," etc.), the name and number of the B subscriber are again displayed there.

After this raising of the priority level of the display with "menu," the process of reducing the priority level begins again (again after the already-mentioned fixed minimum time).

The menu is thus combined either with "call number/name" or with the "fees," whereby "call number/name" can have both priority level "3" and also priority level "5," while the display "fees" is always allocated priority level "5."

Although modifications and changes may be suggested by those skilled in the art, it is the intention of the inventors to embody within the patent warranted hereon all changes and modifications as reasonably and properly come within the scope of their contribution to the art.

What is claimed is:

1. A method for controlling the display of items of information in an optical display installation in a program-controlled apparatus, comprising the steps of:

storing in a memory items of information to be displayed and a currently displayed item of information, said items of information having first and second information parts, said first information part comprising information which is specific to processes undertaken via the apparatus, said second information part comprising information that is not specific to a process undertaken via the apparatus including a menu and at least indicates a process which is configured to be executed via the apparatus and which the apparatus is configured to execute;

allocating display priority levels to the items of information; and displaying an item of information with a higher priority level with a higher priority in relation to an item of information with a lower priority level, wherein, the priority level of a displayed item of information is changeable, and in a given technical state of the apparatus, items of information with different priority levels comprise the same second information part.

2. The method of claim 1 wherein the program-controlled apparatus is a telecommunication apparatus.

3. The method according to claim 1, comprising the step of reducing the priority of a displayed item of information by at least two priority levels.

4. The method of claim 1 comprising the step of displaying the second information part of the items of information with different priority levels in a predetermined region of the optical display installation.

5. The method according to claim 1, comprising the step of reducing the priority level of a displayed item of information depending upon elapsed display time.

6. The method according to claim 1, comprising the step of reducing the priority level of a displayed item of information depending upon state-individual information.

7. The method of claim 1, comprising the step of overwriting the displayed item of information stored in the memory by an item of information to be displayed that has the same priority level as the displayed item of information.

8. A circuit configured for controlling display of items of information in an optical display installation in a program-controlled apparatus, the circuit including a memory associated with the optical display installation which is configured to store items of information to be displayed.

wherein, display priority levels are allocated to the items of information to be displayed so that an item of information with a higher priority level is displayed with a higher priority in relation to an item of information with a lower priority level, said items of information to be displayed having first and second information parts, said first information part comprising information which is specific to processes undertaken via the apparatus, said second information part comprising information which is not specific to a process undertaken via the apparatus including a menu and at least one menu point which indicates a process which the apparatus is designed to execute;

wherein, the priority level of a displayed item of information is changeable; and in a given technical state of the apparatus, items of information with different priority levels comprise the same second information part.

9. The circuit of claim 8, characterized in that the circuit comprises both a control unit to which is allocated a control program and the memory for receiving the items of information to be displayed.

10. The circuit of claim 9, characterized in that the memory comprises respective memory areas for receiving items of information with one priority level, one such memory area allocated to each priority level.

11. The circuit of any one of claim 8, 9, or 10, characterized in that the optical display installation comprises at least two display areas, one of which displays the second information part.

12. The circuit of claim 8, wherein the program-controlled apparatus is a telecommunication apparatus.

* * * * *